US 12,111,893 B2

United States Patent
Aigner et al.

(10) Patent No.: US 12,111,893 B2
(45) Date of Patent: *Oct. 8, 2024

(54) SYSTEM AND METHOD FOR PROTECTING SOFTWARE LICENSING INFORMATION VIA A TRUSTED PLATFORM MODULE

(71) Applicant: Microsoft Technology Licensing, LLC, Redmond, WA (US)

(72) Inventors: Ronald Aigner, Redmond, WA (US); Balaji Balasubramanyan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,584

(22) Filed: Feb. 17, 2023

(65) Prior Publication Data
US 2023/0334127 A1 Oct. 19, 2023

Related U.S. Application Data

(63) Continuation of application No. 16/726,641, filed on Dec. 24, 2019, now Pat. No. 11,586,710.

(51) Int. Cl.
*G06F 21/12* (2013.01)
*G06F 16/21* (2019.01)
(Continued)

(52) U.S. Cl.
CPC .......... *G06F 21/123* (2013.01); *G06F 16/212* (2019.01); *G06F 21/554* (2013.01); *H04L 9/3234* (2013.01); *H04L 9/3236* (2013.01); *H04L 9/3247* (2013.01); *G06F 2221/033* (2013.01); *G06Q 2220/18* (2013.01)

(58) Field of Classification Search
CPC ...................................................... G06F 21/123
See application file for complete search history.

(56) References Cited

U.S. PATENT DOCUMENTS 9,246,916 B2 * 1/2016 Ganesan ................. H04L 63/10
9,800,911 B2 * 10/2017 Smith ................. H04N 21/8355
(Continued)

OTHER PUBLICATIONS

Communication pursuant to Article 71(3) EPC, Received for European Application No. 20819992.7, mailed on Jun. 18, 2024, 8 pages.

*Primary Examiner* — Simon P Kanaan (57) ABSTRACT

Methods for protecting software licensing information via a trusted platform module (TPM) are performed by systems and devices. When a licensing server is unreachable, a license is generated for a software application by a licensing manager. The license is generated via a secure register of the TPM using an asymmetric key, specific to the software application and policy-tied to the secure register, to generate a signature of a hashed license file for the software application. The asymmetric key is stored, mapped to the license file, and used for subsequent license validation. A licensing manager validation command is provided to validate the license using the key, as applied to the hash, to verify the signature and checking validity of the time stamp. Time stamp expiration or alteration of the license are determined to provoke invalidation indications for the validating application.

20 Claims, 6 Drawing Sheets

(51) Int. Cl.
*G06F 21/55* (2013.01)
*H04L 9/32* (2006.01)

(56) References Cited

U.S. PATENT DOCUMENTS

2008/0319779 A1* 12/2008 Hughes .................. G06Q 99/00
                                                              705/310
2018/0181726 A1*  6/2018 Ishimi ................... G06F 21/105
2018/0322259 A1* 11/2018 Solow ................... H04L 9/0819
2019/0042707 A1*  2/2019 Young ................... G06F 21/604
2020/0074047 A1*  3/2020 Bhandaru ............. G06F 21/105

* cited by examiner

SYSTEM AND METHOD FOR PROTECTING SOFTWARE LICENSING INFORMATION VIA A TRUSTED PLATFORM MODULE

CROSS-REFERENCE TO RELATED APPLICATIONS

This application is a continuation of U.S. patent application Ser. No. 16/726,641 filed Dec. 24, 2019, entitled "System and Method for protecting software licensing information via a trusted platform module," which is incorporated herein by reference in its entirety. To the extent appropriate a claim of priority is made.

BACKGROUND

Software utilizes license files to guarantee that a user is authorized to use the software. With monthly or yearly subscriptions for licenses, these license files have a time stamp by which they expire. Another application of license files is for trial licenses. Existing solutions to protect licensing files rely on access controls or on obstruction mechanisms such as encoding hardware characteristics of the device into the license, which can be bypassed or overcome by bad actors. Other existing approaches require connectivity to an online service, and cannot be used in offline scenarios.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for protecting software licensing information via a trusted platform module (TPM) are performed by systems and devices. When a licensing server is unreachable, a license is generated for a software application by a licensing manager. The license is protected via a secure register of the TPM using an asymmetric key, specific to the software application and policy-tied to the secure register, to generate a signature of a hashed license file for the software application. The asymmetric key is stored, mapped to the license file, and used for subsequent license validation. A licensing manager validation command is provided to validate the license using the key, as applied to the hash, to verify the signature and check the validity of the time stamp. Time stamp expiration or alteration of the temporary license are determined to provoke invalidation indications for the license.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. INTRODUCTION

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for protecting software licensing information via a TPM. Section III below describes example mobile and computing device embodiments that may be used to implement features of the embodiments described herein. Section IV below describes additional examples and advantages, and Section V provides some concluding remarks.

II. EXAMPLE EMBODIMENTS FOR PROTECTING SOFTWARE LICENSING INFORMATION VIA A TPM

Methods for protecting software licensing information via a trusted platform module (TPM) are performed by systems and devices. Embodiments herein may be directed to client/user systems and/or devices though which a user obtains licenses for different types of software applications (also "software" or "apps"), such as email applications, productivity software, software application suites, etc. For example, a user may utilize a software application such as Outlook® or a suite such as Microsoft® Office from Microsoft Corporation of Redmond, WA, to check email or generate a spreadsheet, which may require a license for such use. In some scenarios, e.g., when a user's device is offline or not connected to a network, a licensing server may not be reachable to verify the license for the installed software. In these cases, a temporary license (also a "grace" license) may be used. A user may already have a temporary license for their software application, or a new temporary license may need to be generated, for the access desired by the user.

The embodiments herein may utilize a TPM, or other equivalent mechanism, in computing devices/systems to help generate and/or protect the license file of a temporary license and ensure that the license file cannot be replaced or tampered with. The embodiments herein also provide for validating standard licenses, long-term licenses, etc., installed for software applications using a TPM. As referred to herein for embodiments, a "license" may refer to and be applicable to, a license of any type. Similarly, embodiments exemplarily described for temporary licenses are also contemplated as being applicable to other license types, e.g., standard licenses, long-term licenses, etc.

As an example, consider a software application installed at a user device that is enabled/configured to make use of these embodiments. The software application may first create/install a license file through an application programming interface (API), or other equivalent mechanism, of licensing software (also a "licensing manager" herein) associated with the user device, e.g., in an operating system such as Windows® from Microsoft Corporation of Redmond, WA. The licensing manager may utilize a secure register of the TPM, e.g., a Platform Configuration Register (PCR), which is configured to be reset, and reset the secure register to its initial value.

Licensing software may then use the TPM and extend a hash of the license file into the secure register. The licensing software may create a key, such as an asymmetric key, via the TPM that is persisted in the TPM. In embodiments, the key may only be utilized for signing and signature verification of licenses, and may only be utilized when the used secure register has a value generated as result of extending the hash of the licensing file. The licensing software then signs the licensing file, and is also configured to keep a record of the licensing file and the associated key that has been created, e.g., in a registry. Accordingly, a robust temporary license is generated that cannot be defeated by conventional techniques of bad actors.

Subsequently, when the software application requires validation of the licensing file for access and use, the software application may call into another API of the licensing manager to verify the temporary license/license file. This second API may reset the secure register used to generate the temporary license and extend the hash of the licensing file into the secure register. The associated key may then be used to verify the signature of the licensing file, and additionally or alternatively, the time stamp may be verified for validity/expiration. Such embodiments are also applicable to validating standard licenses for software applications.

According to embodiments, the key may be generated as being associated with a policy that only allows the key to validate this specific signature because the hash that is extended into the secure register is the same as when the key was created. Then the second API may return the result of the verification to the caller. If the licensing file contains an expiration date, or any tampering with the licensing file is detected when verifying the signature of the licensing file, an invalidation response may be provided to the caller. Additionally, another licensing file with a valid signature that is attempted to be used for defeating the licensing requirement cannot be verified because the hash that is extended into the secure register will be different.

It should be noted that the embodiments herein are not limited to offline scenarios, but are also applicable to cases where a user device is online, i.e., able to connect to a licensing server.

In the context of at least some embodiments, a TPM may refer to a software- or hardware-based technology device that is designed to provide security-related functions for a computing device. A TPM may be embodied as a chip or equivalent hardware module that may be utilized as a secure crypto-processor to carry out cryptographic operations via various physical security mechanisms that make the TPM tamper resistant with respect to bad actors. Additionally, malicious software is unable to tamper with the security functions of the TPM. Some example advantages of utilizing a TPM in the context of protecting software licensing information include, without limitation, the ability to generate, store, and limit the use of cryptographic keys, the availability of secure registers (e.g., PCRs), and ensuring platform integrity by taking and storing security measurements, e.g., for key creation and use with hash values of licensing files. TPM-based keys can be configured to be unavailable outside the TPM which may prevent the keys from being copied and used without the TPM.

The embodiments herein provide for solutions to issues for licensing avoidance by providing secure methods and systems for license generation and persistence via TPMs. These and other embodiments for protecting software licensing information via a TPM will be described in further detail below in association with the Figures, and in the Sections/Subsections that follow.

Figure 1:
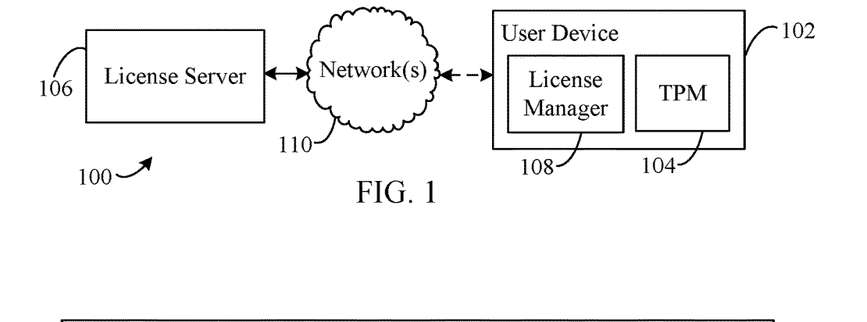
FIG. 1 shows a block diagram of a system for protecting software licensing information via a TPM, according to an example embodiment.

Systems, devices, and apparatuses may be configured in various ways to protect software licensing information via a TPM. For instance, FIG. 1 is a block diagram of a system 100, according to embodiments. System 100 is configured to protect software licensing information via a TPM, according to embodiments. As shown in FIG. 1, system 100 includes a user device 102 and a license server 106. In embodiments, user device 102 and license server 106 may communicate with each other over a network 110, and in some embodiments, user device 102 may be offline and not connected to network 110. It should be noted that various numbers of license hosts and/or user devices may be present in various embodiments. Additionally, any combination of the components illustrated in FIG. 1 may be present in system 100, according to embodiments.

Network 110 may comprise any number and/or type of communication links that connect computing devices and hosts/servers such as, but not limited to, the Internet, wired or wireless networks and portions thereof, point-to-point connections, local area networks, enterprise networks, and/or the like.

License server 106 may comprise one or more server computers or computing devices, which may include one or more distributed or "cloud-based" servers. In embodiments, license server 106 may be associated with, or may be a part of, a cloud-based service platform such as Microsoft® Azure® from Microsoft Corporation of Redmond, WA, and in some embodiments, license server 106 may comprise an on-premises server(s) in addition to, or in lieu of, cloud-based servers. Various systems/devices herein, such as license server 106 may be configured to receive requests for license validation for software applications installed at and/or executing at user device 102, from user device 102 via network 110.

It should be noted that as described herein, license server 106 may be applicable to any type of system for performance of operations, including license validation for software applications, according to embodiments. One example of implementations noted above are network, or "cloud," implementations, applications, or services in a network architecture/platform. A cloud platform may include a networked set of computing resources, including servers, routers, etc., that are configurable, shareable, provide data security, and are accessible over a network such as the Internet. Cloud applications/services such as licensing servers for license validations, etc., may run on these computing resources, often atop operating systems that run on the resources, for entities that access the applications/services, locally and/or over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

User device 102 may be any number, type, or combination of computing devices or computing systems, including a terminal, a personal computer, a laptop computer, a tablet device, a smart phone, a personal digital assistant, a server(s), a wearable device (e.g., a smart watch), a gaming console, and/or the like, including internal/external storage devices, that may be utilized to execute software applications and determine license validity for such software applications. In embodiments, user device 102 may be used by various types of users, including without limitation, software application end users, operating system end users, etc., that obtain licenses to access software. As illustrated, user device 102 includes a TPM 104 and a license manager 108. TPM 104 may be a TPM as described herein that is configured to improve security for generation and persistence of software licenses. License manager 108, described in further detail below, may be part of an operation system of user device 102, and may be configured to perform licensing functions for software applications, and to provide one or more APIs that enable calls/commands for performance of such licensing functions via TPM 104.

User device 102 may also include additional components (not shown for brevity and illustrative clarity) including, but not limited to, components and subcomponents of other devices and/or systems herein, as well as those described below with respect to FIGS. 2, 10, and 11, such as but not limited to, an operating system, etc.

User device 102 may be configured in various ways for protecting software licensing information via a TPM. For instance, referring now to FIG. 2, a block diagram of a system 200 is shown for protecting software licensing information via a TPM, according to an example embodiment. System 200 may be an embodiment of system 100 of FIG. 1, e.g., user device 102. System 200 is described as follows.

System 200 includes a computing device 202, which may be an embodiment of user device 102 of FIG. 1, and which may be any type of server or computing device, as mentioned elsewhere herein, or as otherwise known. As shown in FIG. 2, computing device 202 may include one or more processors ("processor") 204, one or more of a memory and/or other physical storage device ("memory") 206, as well as one or more network interfaces ("network interface") 224. Computing device 202 includes a license manager 208 and a TPM 220 that may respectively be embodiments of license manager 108 and TPM 104 of FIG. 1. License manager 208 and TPM 220 may be configured to protect software licensing information, as described herein, and in embodiments, license manager 208 may comprise a portion of licensing software of an operating system (OS) 216. Computing device 202 may also include or be configured to execute one or more software applications 220 (also "app(s)"), and may include a registry 222.

System 200 may also include additional components (not shown for brevity and illustrative clarity) including, but not limited to, components and subcomponents of other devices and/or systems herein, as well as those described below with respect to FIGS. 10-11.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories (e.g., at least one cache for query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of license manager 208, including one or more of the components thereof as described herein, and/or application(s) 218, which may be implemented as computer program instructions, as described herein.

Memory 206 may include volatile storage portions such as a random access memory (RAM) and/or persistent storage portions such as hard drives, non-volatile RAM, and/or the like, to store or be configured to store computer program instructions/code as described herein, as well as to store other information and data described in this disclosure including, without limitation, OS 216, license manager 208, one or more of application(s) 218, license files of application(s) 218, contents of registry 222, and/or the like.

Network interface 224 may be any type or number of wired and/or wireless network adapter, modem, etc., configured to enable system 200, including computing device 202, to communicate with other devices and/or systems over a network, such as communications between computing device 202 and other devices, systems, hosts, of system 100 in FIG. 1 over a network such as network 110.

Application(s) 218 may be any type of software application, such as email applications, productivity software, software application suites, etc. Application(s) 218 may be executed by processing device 202 and may run on OS 216. As referred to herein, a software application may one of application(s) 218. Application(s) 218 may require a license, such as a standard license or a temporary license, in order to be used. OS 216 may be any OS from any developer/publisher. OS 216 may be enabled to or programmed to verify licenses, such as temporary licenses, for one or more of application(s) 218, via licensing software, e.g., license manager 208. Registry 222 may be a portion of OS 216 in embodiments, and may store information associated with software licenses, such as program identifiers for specific licenses, and keys used to sign the licenses.

License manager 208 of computing device 202 may include a plurality of components for performing the functions and operations described herein for protecting software licensing information via a TPM, such as TPM 220. For instance, license manager 208 may be configured to receive calls to APIs thereof that provide commands to TPM 220 for secure license generation and persistence. As noted above, ones of application(s) 218 may require respective licenses in order to allow their use by a user of a client device such as computing device 202. In some embodiments, computing device 202 may be offline or otherwise unable to access a remote license host over a network. In such scenarios, a software application to be accessed by the user may provide a call or other request to license manager 208 for a license or for verification of an existing license, such as a temporary license for the software application. As illustrated, license manager 208 includes a license determiner 210, an install API 212, a verification API 214, and license file(s) 226.

License file(s) 226 may include one or more license files/licenses specific to ones of application(s) 218. Ones of license file(s) 226 may be generated by license manager 208 for a specific software application based on application information, according to embodiments herein, e.g., for temporary licenses. License file(s) 226 may be persistent stored by memory 206 in a persistent storage portion thereof in embodiments as being associated with license manager 208. As referred to herein, a license file or a license, e.g., a temporary license, may be one of license file(s) 226. In embodiments, a license file may include a validity period for the license, such as a time stamp at which the license was granted and a period of validity therefrom, an expiry time/date for the license, and/or the like.

License determiner 210 is configured to receive requests from software applications for determinations of the presence/absence of licenses, such as standard licenses, and the validity state of such licenses. For example, license determiner 210 may provide an indication, responsive to a request, back to a software application that a license is present or existing therefor, according to embodiments. License determiner 210 may base such an indication on locating a license for the software application as one of license(s) 226, or via communication with a license server such as license server 106 of FIG. 1. Alternatively, license determiner 210 may determine that the requested license is not valid or is not present or as one of license(s) 226, or that the license host is unreachable over a network. In these scenarios, the indication may convey to the software application that there is no license, and the software application may determine that it lacks a valid temporary license, standard license, etc.

Install API 212 is configured to be exposed by license manager 208 to service calls from software applications to create and install a software license therefor, e.g., a temporary license. Install API 212 is configured to provide commands to TPM 220, as described herein, for secure generation of license files/licenses. That is, install API 212 enables a software application to indirectly utilize TPM 220 to securely generate license files/licenses.

Verification API 214 is configured to be exposed by license manager 208 to service calls from software applications for verification of license files/licenses. Verification API 214 is configured to provide commands to TPM 220, as described herein, for robust verification of license validity. That is, verification API 214 enables a software application to indirectly utilize TPM 220 to securely verify license files/licenses.

TPM 220 may comprise a hardware-based technology device that is designed to provide security-related functions for a computing device. TPM 220 may be embodied as a chip or equivalent module in computing device 202, or as a secure software implementation, and may be configured to be utilized as a secure crypto-processor to carry out cryptographic operations. TPM 220 may include one or more secure registers, a key generator, memory, etc., further details of which are described below. Accordingly, TPM 220 may be configured to protect software licensing information in conjunction with license manager 208, as described herein.

Figure 2:
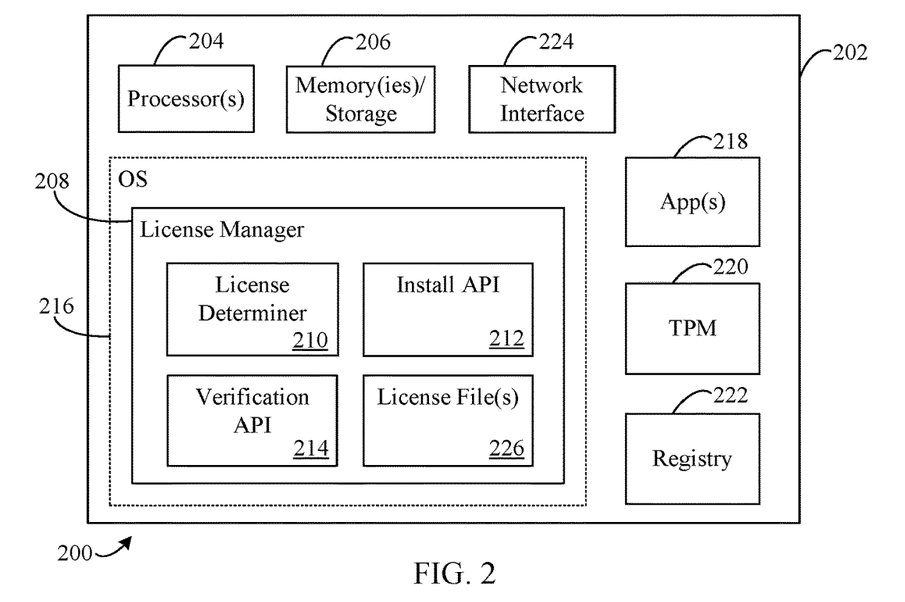
FIG. 2 shows a block diagram of a computing system configured for protecting software licensing information via a TPM, according to an example embodiment.
Figure 3:
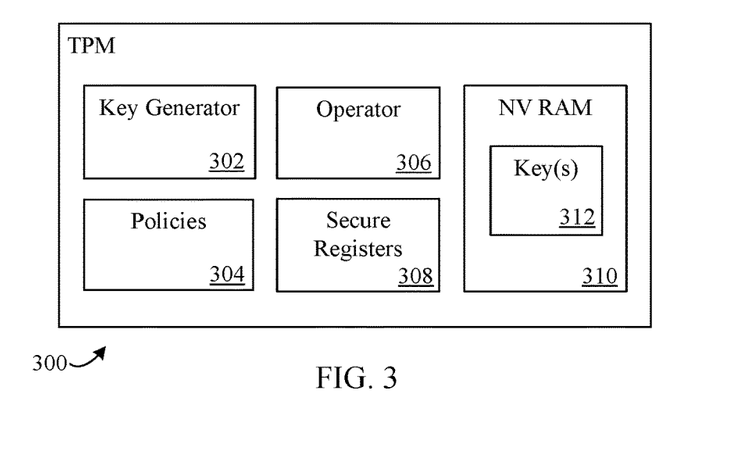
FIG. 3 shows a block diagram for the trusted platform module of FIG. 2 for protecting software licensing information, in accordance with an example embodiment.

For example, FIG. 3 shows a block diagram of a TPM 300 for protecting software licensing information that may be an embodiment of TPM 220 of FIG. 2. TPM 300 is described as follows.

TPM 300 includes a key generator 302, policies 304, an operator 306 and secure registers 308. Key generator 302 is configured to generate keys, e.g., asymmetric keys, to be utilized in signing and signature verification of license files/licenses. In embodiments, license manager 208 of FIG. 2 may request that a key for a specific software application be generated by key generator 302 for utilization in signing and signature verification. Key generator 302 may generate keys as being associated with one or more of policies 304. For example, a policy of policies 304 may specify that key may only be utilized for signing and signature verification of licenses, and may only be utilized when the used secure register has a value generated as result of extending the hash of the licensing file. In some embodiments, one or more of policies 304 may be stored in association with license manager 208 at memory 206 of FIG. 2 and may be provided from license manager 208 to TPM 300 with a request for key generation.

Operator 306 may be configured to perform operations for TPM 300 as described herein, including but without limitation, hashes of license files, resetting of values of secure registers 308, extending of hashes to secure registers 308, determinations of hashes being the same or different, determinations of expirations of time stamps, and/or the like. Secure registers 308 may include one or more registers of TPM 300, e.g., PCRs in embodiments, configured to provide secure storage of information within TPM 300.

As shown, TPM 300 also includes a non-volatile (NV) random access memory (RAM) 310 that stores, or is configured to store, one or more key(s) 312. Key(s) 312 may be keys, such as asymmetric keys, generated by key generator 302, as described above. By storing/persisting key(s) 312 in NV-RAM 310, TPM 300 may prevent access or disclosure of key(s) 312 outside of TPM 300, thus adding an additional security measure to the protection of the licenses and licensing information. In embodiments, key(s) 312 may comprise a data structure for storage of keys that maps the keys to their respective license files and/or software application identifiers.

It is also contemplated herein that TPM 300 may include additional components and features not shown for brevity and illustrative clarity, as would be understood by those of skill in the relevant art(s) having the benefit of this disclosure.

While shown separately for illustrative clarity, in embodiments, one or more of the components of license manager 208 of FIG. 2 and/or TPM 300 of FIG. 3 may be combined together and/or as a part of other components of system 200 and/or TPM 300. In some embodiments, less than all of the components of license manager 208 and/or TPM 300 as illustrated may be included. In software implementations, one or more components of license manager 208 may be stored in memory 206, and may be executed by processor 204. Further details regarding license manager 208 and TPM 300, and their respective subcomponents, are described below.

Figure 4:
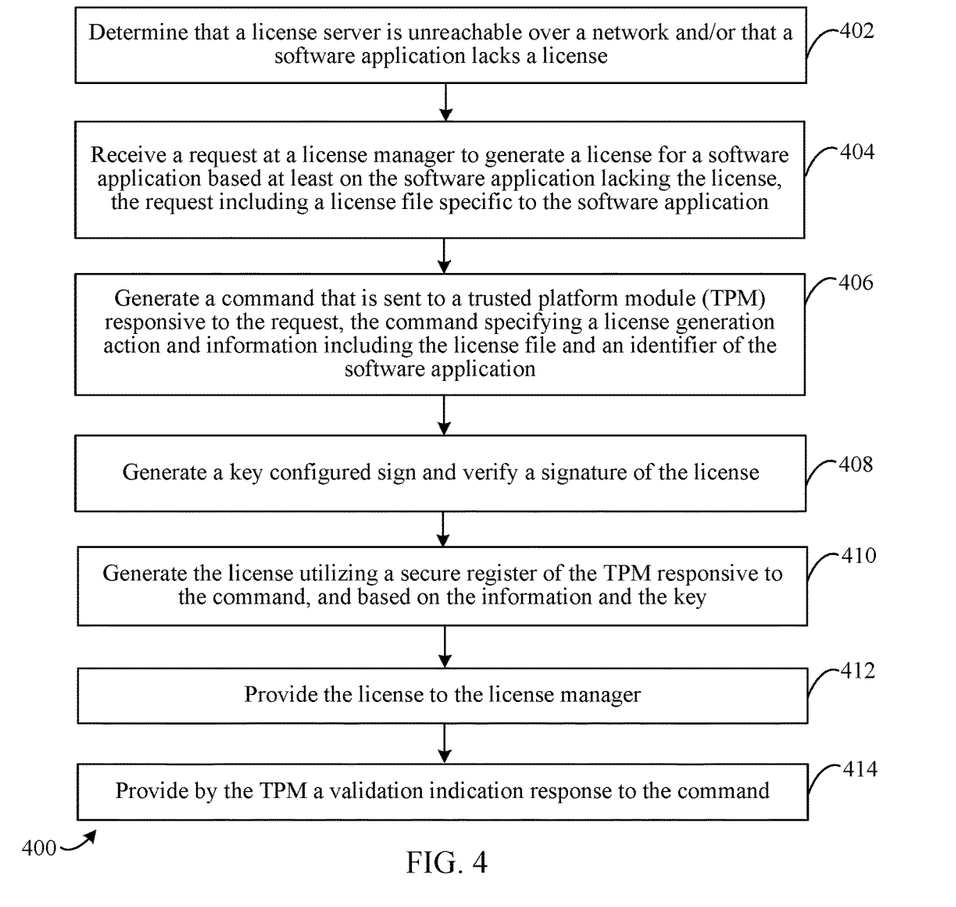
FIG. 4 shows a flowchart for protecting software licensing information via a TPM, in accordance with an example embodiment.

As noted above for FIGS. 1-3, embodiments herein provide for protecting software licensing information via a TPM. System 100 of FIG. 1, system 200 of FIG. 2, and TPM 300 of FIG. 3 may each be configured to perform such functions and operations. FIG. 4 will now be described. FIG. 4 shows a flowchart 400 for protecting software licensing information via a TPM, according to example embodiments. System 200 and license manager 208 of computing device 202 in FIG. 2 as well as TPM 300 of FIG. 3 may operate according to flowchart 400, in embodiments. Further structural and operational examples will be apparent to persons skilled in the relevant art(s) based on the following descriptions. Flowchart 400 is described as follows with respect to system 100 of FIG. 1, system 200 of FIG. 2, and TPM 300 of FIG. 3.

Flowchart 400 begins at step 402. In step 402, it is determined that a license server is unreachable over a network and/or that a software application lacks a license. For example, a software application may determine an offline state for a computing device on which the software application is executing, where a license server/host is unreachable, or that a license is not present for the software application. In embodiments, such determinations may be made in conjunction with license determiner 210 of license manager 208 in FIG. 2, or alternatively by license determiner 210, as described above.

In step 404, a request is received at a license manager to generate a license for a software application based at least on the software application lacking a license, the request including a license file specific to the software application. For instance, install API 212 of license manager 208 may be configured to receive a request or a call from the software application in step 402. The request or call may include information about the software application, such as an identifier of the software application, a period of time, authorizations, and/or permissions to be associated with the license, as well as a license file associated with the software application. In embodiments, the license file may include one or more portions of the information in the request. Additionally, the request or call may be sent by the software application responsive to the determination made in step 402.

In step 406, a command is generated that is sent to a TPM responsive to the request, the command specifying a license generation action and information including the license file and an identifier of the software application. For instance, install API 212 may be configured to generate the command and send the command to TPM 220 or TPM 300 of FIG. 3 (hereinafter for flowchart 400), based on the request or call from step 404. Install API 212 may generate the command to specify that an action be taken by TPM 300 in furtherance of the generation of the license requested. The command may also be generated to include, or be accompanied by, the license file from the software application and an identifier therefor.

In step 408, a key is generated that is configured sign and verify a signature of the license. For example, install API 212 may include as part of the command generated in step 406 the performance of a key generation action to be performed by key generator 302. In embodiments, key generator 302 may generate an asymmetric key that is specific to the license file for signing and later verifying its signature, as described herein. The key may be generated based on a hash of the license file, as described in further detail below with respect to FIG. 5. The generated key may be stored by key generator 302 in NV-RAM 310 as one of key(s) 312. In embodiments, the key may be mapped to the license file and/or to the identifier of the software application in a data structure of NV-RAM 310, as described herein.

In step 410, the license is generated utilizing a secure register of the TPM responsive to the command, and based on the information and the key. For example, if a time stamp or expiration time for the license, e.g., as for a temporary license, is not included in the license file, operator 306 of TPM 300 may be configured to capture a time stamp to be associated with the temporary license file. The time stamp and/or the license file from the information of step 406 may be signed by operator 306, license manager 208 via install API 212, or license manager 208 via install API 212 and operator 306, using one of secure registers 308 of TPM 300 based on the key generated in step 408. Non-temporary licenses may be generated without the use of time stamps, in embodiments. Additional details regarding the operation of step 410 are provided below with respect to FIG. 5.

In step 412, the license is provided to the license manager. For instance, TPM 300 may provide the generated license back to license manager 208. License manager 208 may then store the license as one of license file(s) 226. In embodiments, the license may comprise the signed license file.

In step 414, a validation indication response to the command is provided by the TPM. For example, TPM 300 may provide a response with an indication of validity of the license back to license manager 208, which may in turn provide the indication response to the software as a response to the request or call to install API 212. In embodiments, step 412 and step 414 may be combined as a single operation.

Figure 5:
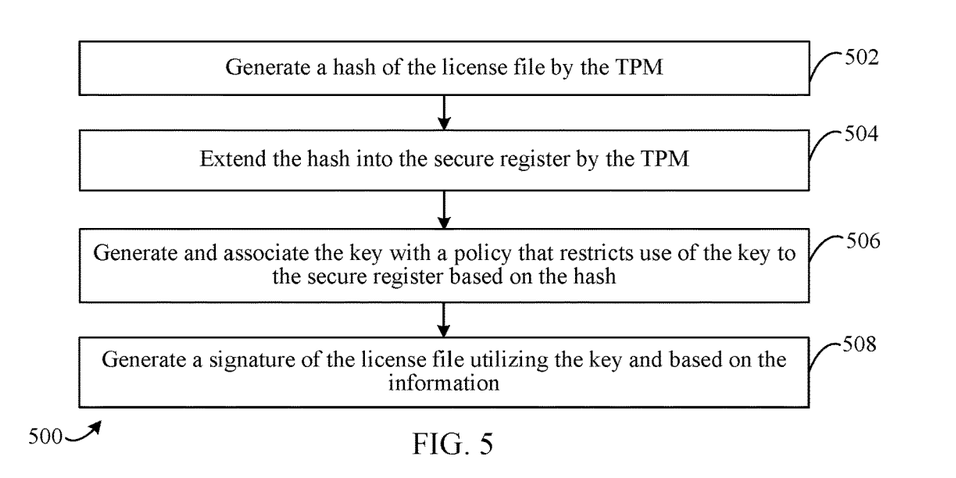
FIG. 5 shows a flowchart for protecting software licensing information via a TPM, in accordance with an example embodiment.

FIG. 5 will now be described in the context of flowchart 400 of FIG. 4. FIG. 5 shows a flowchart 500 for protecting software licensing information via a TPM, according to example embodiments. System 200 and license manager 208 of computing device 202 in FIG. 2 and TPM 300 of FIG. 3 may operate according to flowchart 500, in embodiments. Further structural and operational examples will be apparent to persons skilled in the relevant art(s) based on the following descriptions. Flowchart 500 may be an embodiment of flowchart 400 of FIG. 4, and is described as follows with respect to system 200 of FIG. 2 and TPM 300 of FIG. 3.

Flowchart 500 begins with step 502. In step 502, a hash of the license file is generated by the TPM. For instance, operator 306 of TPM 300 may be configured to generate a hash of the license file from the information in step 406 of flowchart 400. In embodiments, the hash may be generated prior to generation of the key in step 408 of flowchart 400.

In step 504, the hash is extended into the secure register by the TPM. For example, operator 306 of TPM 300 may extend the hash of the license file generated in step 502 to a secure register of secure registers 308. In embodiments, operator 306 may reset the secure register to an initial value prior to extending the hash thereto.

In step 506, the key is generated and associated with a policy that restricts use of the key to the secure register based on the hash. Step 506 may be a further embodiment of step 408 of flowchart 400. For instance, key generator 302 of TPM 300 may be configured to generate the key as being associated with a policy of policies 304. In embodiments, the policy may require that the key be utilized for the secure register in association with generated hash of step 502 when extended into the secure register as described in step 504. That is, the key may be restricted to use with the secure register and the hash.

In step 508, a signature of the license file is generated utilizing the key and based on the information. Step 508 may be a further embodiment of step 410 of flowchart 400. For example, the license may be generated based on the generation of a signature for the license file from the information of step 406 using the key.

Accordingly, a secure mechanism for generation of a license is achieved at least through the restriction for the use of the key being tied to the secure register and the hash generated by TPM 300 as extended into the secure register.

Figure 6:
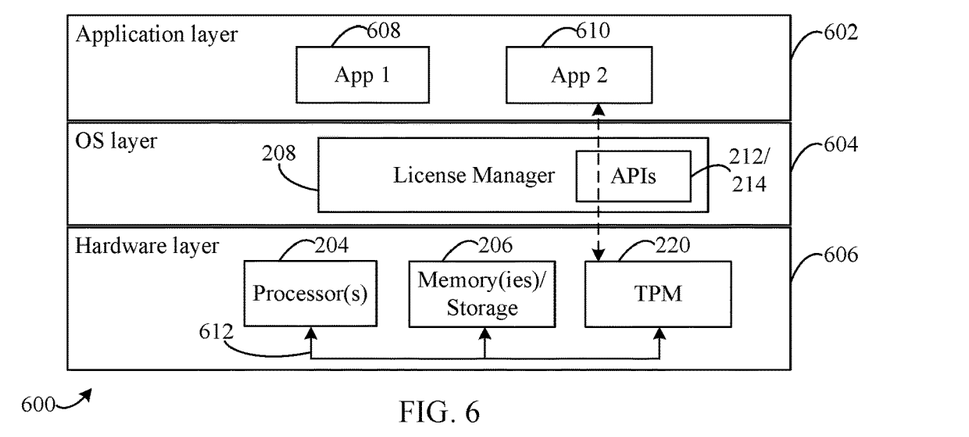
FIG. 6 shows a block diagram for the system in FIG. 2 with respect to a system communication layer model, in accordance with an example embodiment.

Referring now to FIG. 6, a block diagram for a system communication layer model 600 ("model 600") with respect to system 200 of FIG. 2 is shown, according to example embodiments. Model 600 includes an application layer 602, an operating system (OS) layer 604, and a hardware layer 606. As exemplarily shown, an application app 1 608 and an application app 2 610 may reside in application layer 602. Application app 1 608 and application app 2 610 may be ones of application(s) 218 shown in system 200 of FIG. 2, and may be any application that requires a license for use thereof. Below application layer 602, license manager 208 of system 200 resides in OS layer 604, and install API 212 and verification API 214 are illustrated for license manager 208. Below OS layer 604 is hardware layer 606 which includes processor 204, memory 204, and TPM 220 (or TPM 300 of FIG. 3, in embodiments), being connected by a system bus 612 that enables communications therebetween in accordance with the described embodiments for protecting software licensing information via a TPM.

Model 600 illustrates how the embodiments herein allow for an application, e.g., app 2 610, to request secure generation of a license such as a temporary license that may be provided utilizing TPM 200 via install API 212 without direct access to TPM 220 from applications of application layer 602.

Model 600 also illustrates how the described embodiments allow for an application, e.g., app 2 610, to subsequently request secure validation of the license utilizing TPM 200 via validation API 214 without direct access to TPM 220 from applications of application layer 602 as described in further detail below.

Figure 7:
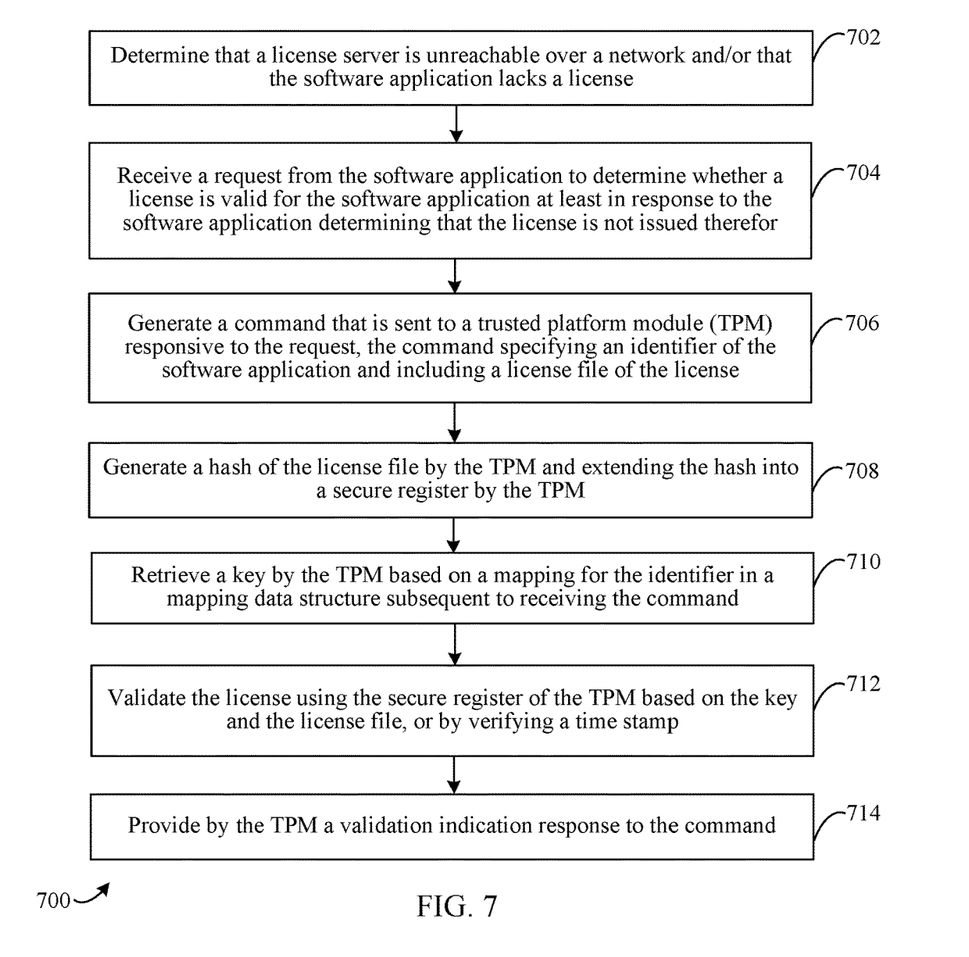
FIG. 7 shows a flowchart for protecting software licensing information via a TPM, in accordance with an example embodiment.

For example, FIG. 7 shows a flowchart 700 for protecting software licensing information via a TPM, according to example embodiments. System 200 and license manager 208 of computing device 202 in FIG. 2 as well as TPM 300 of FIG. 3 may operate according to flowchart 700, in embodiments. Further structural and operational examples will be apparent to persons skilled in the relevant art(s) based on the following descriptions. Flowchart 700 is described as follows with respect to system 100 of FIG. 1, system 200 of FIG. 2, and TPM 300 of FIG. 3.

Flowchart 700 begins at step 702. In step 702, it is determined that a license server is unreachable over a network and/or that the software application lacks a license. For example, a software application may determine an offline state for a computing device on which the software application is executing, where a license server/host is unreachable, or that a license is not present for the software application. In embodiments, such determinations may be made in conjunction with license determiner 210 of license manager 208 in FIG. 2, or alternatively by license determiner 210, as described above.

In step 704, a request is received from the software application to determine whether a license is valid for the software application at least in response to the software application determining that a license is not issued therefor. For instance, verification API 214 of license manager 208 in system 200 may be configured to receive a request or a call from the software application in step 702. The request or call may specify a determination be made as to whether or not a standard or temporary license exists and/or is valid for the software application, and may include an identifier of the software application. In embodiments, the request or call may be received responsive to the determination made in step 704. In embodiments, license determiner 210 of license manager 208 may determine if the license exists and is stored in license file(s) 226.

In step 706, a command is generated that is sent to a TPM responsive to the request, the command specifying an identifier of the software application and including a license file of the license. For instance, verification API 214 may be configured to generate the command and send the command to TPM 220 or TPM 300 of FIG. 3 (hereinafter for flowchart 700), based on the request or call from step 704. Verification API 214 may generate the command to specify that an action be taken by TPM 300 in furtherance of the validation determination for the license as requested. The command may also be generated to include, or be accompanied by, the license file for the software application, e.g., as signed and stored in license file(s) 226, and an identifier of the software application, e.g., as provided in the request or call, or as determined from information in registry 222, or as stored with the license file.

In step 708, a hash of the license file is generated by the TPM and extended into a secure register by the TPM. For instance, operator 306 of TPM 300 may be configured to generate a hash of the license file provided with the command in step 706. Operator 306 may also extend the hash of the license to a secure register of secure registers 308. In embodiments, operator 306 may reset the secure register to an initial value prior to extending the hash thereto.

In step 710, a key is retrieved by the TPM based on a mapping for the identifier in a mapping data structure subsequent to receiving the command. For example, after receipt of the command by TPM 300, operator 306 may retrieve the key used to sign the license file from key(s) 312 stored in NV-RAM 310 (as described in step 408 of flowchart 400). That is, the key may be mapped to the license file and/or to the identifier of the software application in a data structure of NV-RAM 310, and may be thus identified by operator 306.

In step 712, the license is validated using the secure register of the TPM based on the key and the license file, or by verifying a time stamp. For instance, operator 306 of TPM 300 may utilize the key retrieved in step 710 to validate the signature of the signed license file. As described in step 708, the hash of the license file is generated and extended into the secure register, and it is enabled to be used to verify the signature at least because the secure register currently contains the hash that was also present when the key was created, e.g., as described in step 408 of flowchart 400 and in step 506 of flowchart 500. In some embodiments, verification API 214 may verify a time stamp of a temporary license, e.g., an expiry date of the temporary license, a current time stamp with respect to a validity time period or expiration date of the temporary license, and/or the like.

In step 714, a validation indication response to the command is provided by the TPM. For example, TPM 300 may provide a response with an indication of validity of the license back to license manager 208, which may in turn provide the indication response to the software as a response to the request or call to validation API 214.

Figure 8:
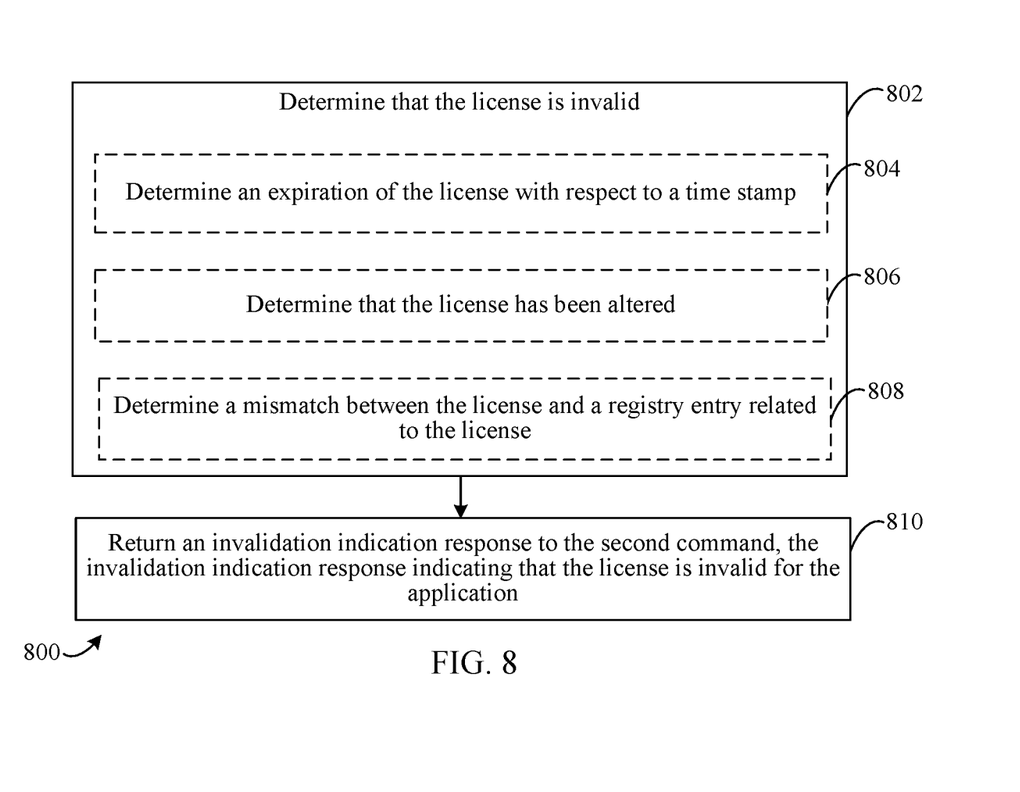
FIG. 8 shows a flowchart for protecting software licensing information via a TPM when the license has been illegally tampered with, in accordance with an example embodiment.

Embodiments herein also provide for determinations of invalidity for licenses, including temporary licenses, that are invalid utilizing a TPM, such as TPM 300 of FIG. 3. FIG. 8 shows a flowchart for protecting software licensing information via a TPM, according to example embodiments. System 200 and license manager 208 of computing device 202 in FIG. 2 as well as TPM 300 of FIG. 3 may operate according to flowchart 800, in embodiments. Further structural and operational examples will be apparent to persons skilled in the relevant art(s) based on the following descriptions. Flowchart 800 may be an embodiment of flowchart 700 of FIG. 7, and is described as follows with respect to system 100 of FIG. 1, system 200 of FIG. 2, and TPM 300 of FIG. 3.

Flowchart 800 begins at step 802. In step 802, it is determined that the license is invalid. For instance, step 802 may be performed subsequent to step 712 of flowchart 700 and in lieu of step 712 and step 714 when a license file is not valid. In embodiments, license manager 208 and/or TPM 300 may be configured to perform step 802, and step 802 may include one or more sub-steps: step 804, step 806, and/or step 808.

In step 804, an expiration of the license with respect to a time stamp is determined. For example, license determiner 208 and/or validation API 214 may be configured to determine expiration of temporary licenses by analyzing ones of license file(s) 226 to determine expiration times. For instance, it may be determined that a temporary license may be invalid after an expiration date included in the license file, that a temporary license is valid for a time period subsequent to a time stamp in the license file, etc.

In step 806, it is determined that the license has been altered. For instance, TPM 300 may be configured to determine that alterations have been made to a license file. In one example, a license file that otherwise appears valid may be determined as altered and invalid by operator 306 of TPM 300 based on a failure to validate a signature of the license file using the signing key. That is, a signature of a license file that appears valid may not be able to be validated because a hash of an altered license file that is extended into one of secure registers 308 for validation against the key will not match the hash that was present in the secure register when the key was created. Thus, the license file may be determined as altered and invalid.

In step 808, a mismatch between the license and a registry entry related to the license is determined. For example, in some embodiments, information for an entry in registry 222 of FIG. 2 for a license file may not match a current license file that is attempted to be used for a software application. Licensing manger 208 may sign the licensing file, e.g., via TPM 300, after its generation and is configured to keep a record of the licensing file and the associated key that has been created for the signing in registry 222. Licensing manger 208, e.g., via verification API 214, and/or TPM 300 may be configured to compare information related to a license file that is provided during validation operations described herein with the entry record in registry 222, and any mismatches determined for this comparison may indicate the invalidity of the provided license file.

In step 810, an invalidation indication response to the second command is returned, the invalidation indication response indicating that the license is invalid for the application. For instance, TPM 300 may provide a response with an indication of invalidity of the license back to license manager 208, which may in turn provide the indication response to the software as a response to the request or call to validation API 214.

Figure 9:
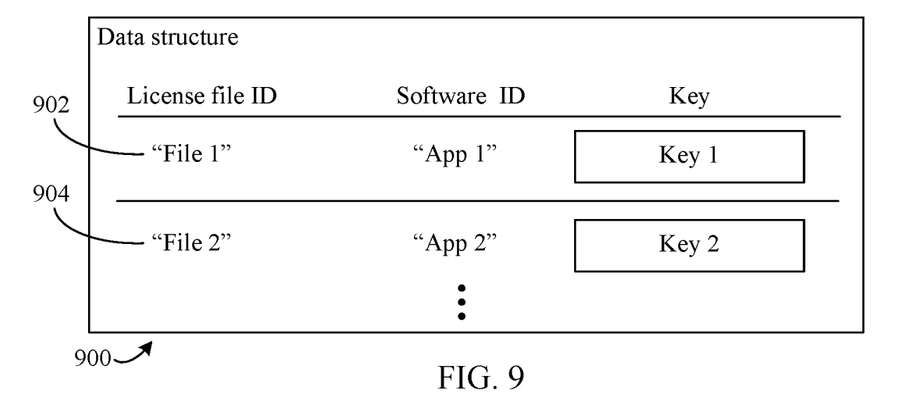
FIG. 9 shows a diagram of a data structure for protecting software licensing information via a TPM, in accordance with an example embodiment.

Referring now to FIG. 9, a diagram of a data structure 900 for protecting software licensing information via a TPM is shown, according to example embodiments. Data structure 900 may comprise a portion of NV-RAM 310 and/or key(s) 312 of TPM 300 in FIG. 3. Data structure 900 is configured as a mapping for keys, as described herein. In embodiments, data structure 900 may be a file-to-key mapping that associates generated keys in a storage with license files, such as temporary license files, for identification and/or retrieval of the keys for license file generation and/or validation, as described for the embodiments herein.

Data structure 900 may include fields/entries for a key and for a license file identifier (ID). As illustrated, data structure 900 exemplarily stores two key mappings: a first mapping 902 and a second mapping 904. First mapping 902 includes a first license file ID "File 1" that is mapped to a first key "Key 1," while second mapping 904 includes a second license file ID "File 2" that is mapped to a second key "Key 2." That is, the key may be stored (e.g., as part of key(s) 312, described above) and mapped to an ID of the license file to which it is associated. In this manner, when a license file is installed for a software application, including the signing of the license file with a generated key, the key may be stored in a way that it is readily identifiable and retrievable for license file validation when a subsequent request or call is received to validate the associated license file.

In some embodiments, in addition to or in lieu of the license file ID being used for the mapping, a software identifier (ID) of the software application with which the license file is associated may be used for mapping to the key in data structure 600. As exemplarily illustrated in FIG. 9, a software ID field/entry may be included for data structure 900. Accordingly, first mapping 902 may include a first software ID "App 1" and second mapping 904 may include a second software ID "App 2." In this manner, a generated key may be stored in an additional or alternative way such that it is readily identifiable and retrievable for license file validation when a subsequent request or call is received to validate the associated license file. It should also be noted that in embodiments, the software ID may not be used or may not be present in data structure 900.

III. EXAMPLE MOBILE AND COMPUTING DEVICE EMBODIMENTS

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 of FIG. 1, system 200 of FIG. 2, TPM 300 of FIG. 3, model 600 of FIG. 6, and data structure 900, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 10:
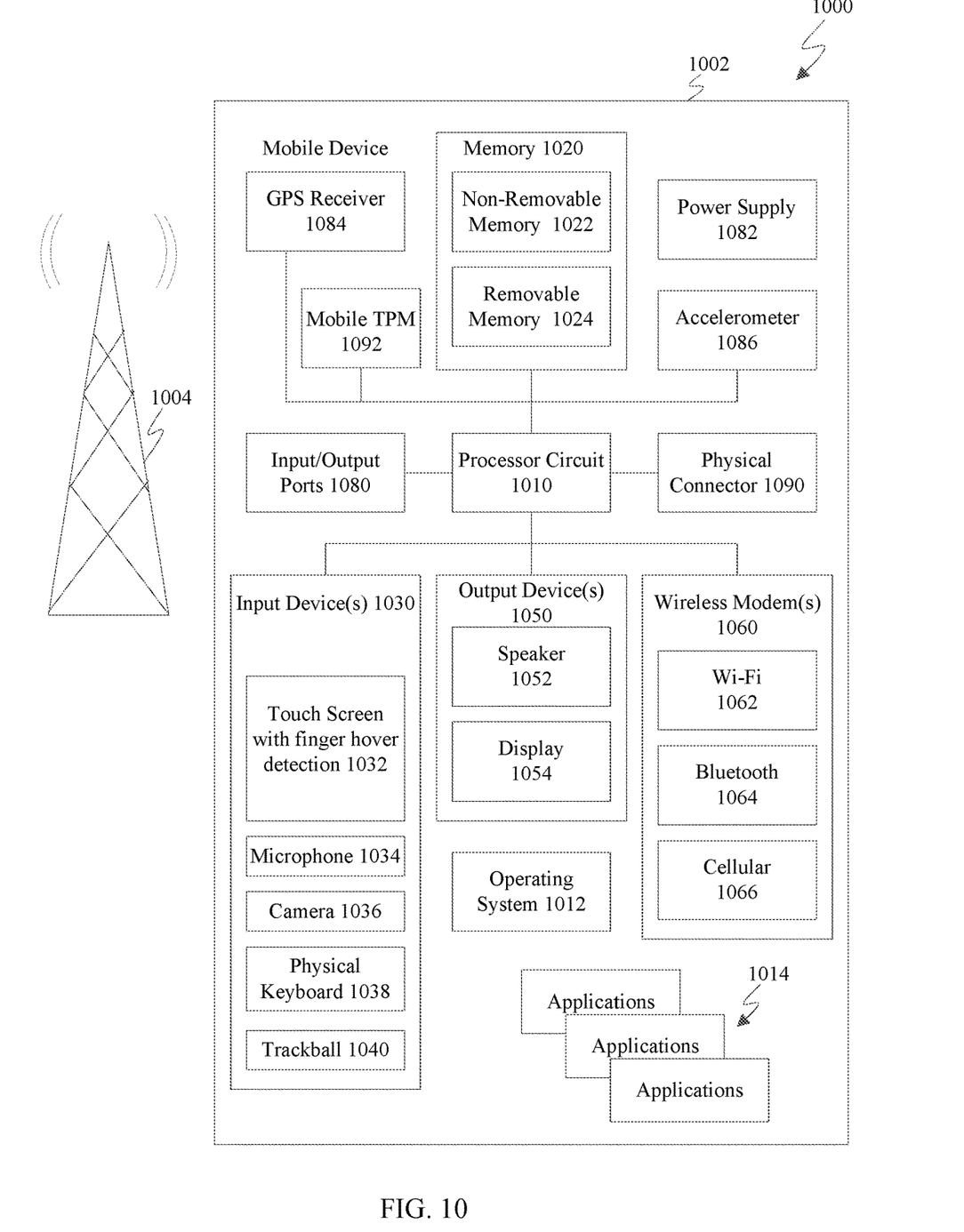
FIG. 10 shows a block diagram of an example mobile device that may be used to implement embodiments.

FIG. 10 is a block diagram of an exemplary mobile system 1000 that includes a mobile device 1002 that may implement embodiments described herein. For example, mobile device 1002 may be used to implement any system, client, or device, or components/subcomponents thereof, in the preceding sections. As shown in FIG. 10, mobile device 1002 includes a variety of optional hardware and software components. Any component in mobile device 1002 can communicate with any other component, although not all connections are shown for ease of illustration. Mobile device 1002 can be any of a variety of computing devices (e.g., cell phone, smartphone, handheld computer, Personal Digital Assistant (PDA), etc.) and can allow wireless two-way communications with one or more mobile communications networks 1004, such as a cellular or satellite network, or with a local area or wide area network.

Mobile device 1002 can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components of mobile device 1002 and provide support for one or more application programs 1014 (also referred to as "applications" or "apps"). Application programs 1014 may include common mobile computing applications (e.g., e-mail applications, calendars, contact managers, web browsers, messaging applications) and any other computing applications (e.g., word processing applications, mapping applications, media player applications).

Mobile device 1002 can include memory 1020. Memory 1020 can include non-removable memory 1022 and/or removable memory 1024. Non-removable memory 1022 can include RAM, ROM, flash memory, a hard disk, or other well-known memory devices or technologies. Removable memory 1024 can include flash memory or a Subscriber Identity Module (SIM) card, which is well known in GSM communication systems, or other well-known memory devices or technologies, such as "smart cards." Memory 1020 can be used for storing data and/or code for running operating system 1012 and application programs 1014. Example data can include web pages, text, images, sound files, video data, or other data to be sent to and/or received from one or more network servers or other devices via one or more wired or wireless networks. Memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1020. These programs include operating system 1012, one or more application programs 1014, and other program modules and program data. Examples of such application programs or program modules may include, for example, computer program logic (e.g., computer program code or instructions) for implementing one or more of system 100 of FIG. 1, system 200 of FIG. 2, TPM 300 of FIG. 3, model 600 of FIG. 6, and data structure 900, along with any components and/or sub-components thereof, as well as the flowcharts/flow diagrams described herein, including portions thereof, and/or further examples described herein.

Mobile device 1002 can include a mobile TPM 1092. Mobile TPM may be a mobile device equivalent embodiment of the TPMs described herein, as would be understood by one of skill in the relevant art(s) having the benefit of this disclosure. For example, mobile TPM 1092 may be configured to perform one or more functions or operations as described for TPMs herein for protecting software licensing information via a TPM.

Mobile device 1002 can support one or more input devices 1030, such as a touch screen 1032, a microphone 1034, a camera 1036, a physical keyboard 1038 and/or a trackball 1040 and one or more output devices 1050, such as a speaker 1052 and a display 1054. Other possible output devices (not shown) can include piezoelectric or other haptic output devices. Some devices can serve more than one input/output function. For example, touch screen 1032 and display 1054 can be combined in a single input/output device. Input devices 1030 can include a Natural User Interface (NUI).

One or more wireless modems 1060 can be coupled to antenna(s) (not shown) and can support two-way communications between processor 1010 and external devices, as is well understood in the art. Modem 1060 is shown generically and can include a cellular modem 1066 for communicating with the mobile communication network 1004 and/or other radio-based modems (e.g., Bluetooth 1064 and/or Wi-Fi 1062). At least one wireless modem 1060 is typically configured for communication with one or more cellular networks, such as a GSM network for data and voice communications within a single cellular network, between cellular networks, or between the mobile device and a public switched telephone network (PSTN).

Mobile device 1002 can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components of mobile device 1002 are not required or all-inclusive, as any components can be deleted and other components can be added as would be recognized by one skilled in the art.

In an embodiment, mobile device 1002 is configured to implement any of the above-described features of flowcharts herein. Computer program logic for performing any of the operations, steps, and/or functions described herein may be stored in memory 1020 and executed by processor 1010.

Figure 11:
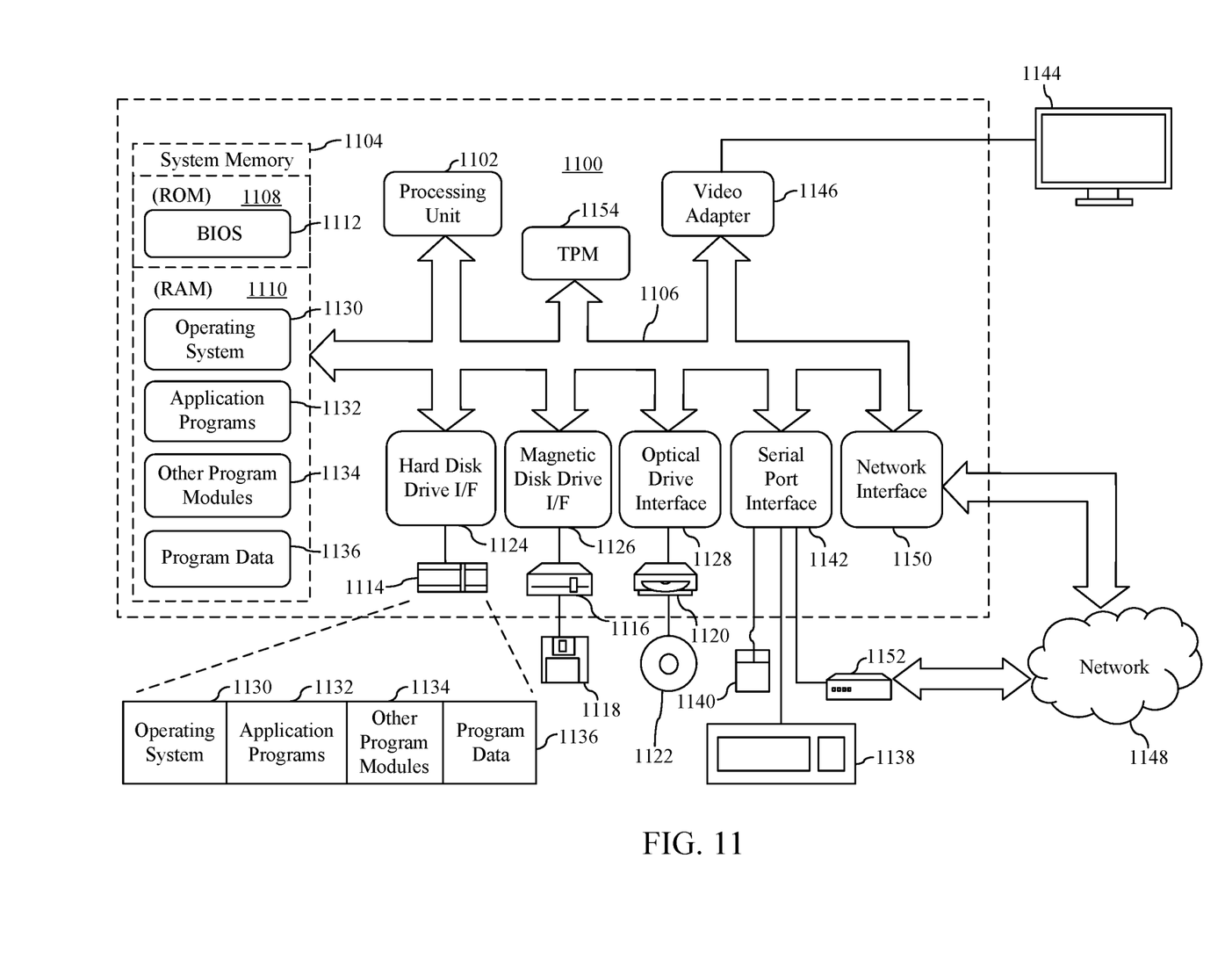
FIG. 11 shows a block diagram of an example computing device that may be used to implement embodiments.

FIG. 11 depicts an exemplary implementation of a computing device 1100 in which embodiments may be implemented. For example, embodiments described herein may be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems and/or game consoles, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing embodiments described herein, such as but not limited to, system 100 of FIG. 1, system 200 of FIG. 2, TPM 300 of FIG. 3, model 600 of FIG. 6, and data structure 900, along with any components and/or subcomponents thereof, as well as the flowcharts/flow diagrams described herein, including portions thereof, and/or further examples described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

TPM 1154 may be connected to bus 1106, and may be an embodiment of TPM 220 of FIG. 2 and/or TPM 300 of FIG. 3, as described herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. ADDITIONAL EXAMPLES AND ADVANTAGES

As described, systems and devices embodying the techniques herein may be configured and enabled in various ways to perform their respective functions for protecting software licensing information via a TPM. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The described embodiments combine new methods of protecting software licensing information via a TPM, e.g., utilizing secure registers of a TPM for generation and validation of licenses. The embodiments described herein utilize a combination novel APIs for licensing software (that allow license file information to be provided to a TPM), secure registers of the TPM, and a hash/policy-tied key for generating and validating license file signatures, which was previously not available for software applications and license security.

For example, while standard cryptographic signature validation is often used to determine if a file has been modified, the embodiments herein that utilize the secure registers of a TPM, e.g., PCRs, provides additional security for licenses above and beyond the use of typically available memory or registers for performing such functions. That is, the use of the TPM registers as in the described embodiments allows for the key to be used only with one specific license file, and only when a hash of the original license file is present in the register of the TPM.

For instance, the key could be used to sign other files as well, if not bound to register values for the hash, and that would allow an attacker to sign a forged license file and bypass security measures to replace an original, expired license file with a new file. So when software calls the verification API, a simple signature validation would succeed without the use of the TPM secure register. The embodiments herein prevent license file secure from being defeated in this way. As noted herein, an attempt to use another licensing file with a valid signature for defeating a licensing requirement cannot be verified because a hash that is extended into a secure register of a TPM will be different from the hash value that was present at key generation.

Embodiments herein are also applicable to mobile and personal devices, and not just to computing devices such as servers, desktops, laptops, and/or the like. In such embodiments, a mobile TPM may be embedded in a mobile device to be utilized in operations for protecting software licensing information via a TPM.

The additional examples and embodiments described in this Section may be applicable to examples disclosed in any other Section or subsection of this disclosure.

Embodiments in this description provide for systems, devices, and methods for protecting software licensing information via a TPM. For instance, a method performed by a computing device is described herein. The computer-implemented method may be for protecting software licensing information via a TPM, as described herein. The computer-implemented method includes receiving a request from a software application to determine whether a license is valid for the software application at least in response to determining that a license is not issued therefor, and generating a command that is sent to a trusted platform module (TPM) responsive to the request, the command specifying an identifier of the software application and including a license file of the license. The computer-implemented method also includes retrieving a key by the TPM based on a mapping for the identifier in a mapping data structure subsequent to receiving the command, validating the license at the TPM using a secure register of the TPM based on the key and the license file, and providing by the TPM a validation indication response to the command.

In an embodiment of the computer-implemented method, the request is a call to an application programming interface (API) and generating the command includes exposing the API which generates and sends the command.

In an embodiment, the computer-implemented method includes determining by the software application that a license server is unreachable over a network, and providing the request based on the license server being unreachable.

In an embodiment, the computer-implemented method includes, prior to retrieving the key, generating a hash of the license file by the TPM and extending the hash into the secure register by the TPM, and validating the license includes verifying at least one of a signature by applying the key or a time stamp.

In an embodiment of the computer-implemented method, the mapping is a key-to-file mapping that associates the license file for the identifier with the key, and the computer-implemented method further includes storing the key-to-file mapping in the mapping data structure subsequent to generation of the license.

In an embodiment, the computer-implemented method further includes receiving a subsequent request from the software application to determine whether the license is present for the software application, generating a subsequent command that is sent to the TPM responsive to the subsequent request, and retrieving the key at the TPM from the mapping data structure. In the embodiment, the computer-implemented method includes determining at the TPM that the license is invalid utilizing the key and the secure register, and providing by the TPM an invalidation indication response to the command. In the embodiment, determining at the TPM that the license is invalid includes at least one of determining that the license has been altered, or determining a mismatch between the license and a registry entry related to the license.

A system is also described herein. The system may be configured and enabled in various ways for protecting software licensing information via a TPM, as described herein. The system includes a trusted platform module (TPM) having a secure register associated therewith, a processing system that includes one or more processors, and a memory that stores computer program instructions to be executed by the processing system. The program code includes first program code configured to determine that a software application lacks a license, provide a first request, to determine whether a license is present for the software application, based at least on the software application lacking the license, and provide a second request, to generate the license for the software application, based at least on the software application lacking the license. The program code also includes second program code configured to receive the first request and the second request, generate a first command that is sent to the TPM responsive to the first request, the first command specifying a license verification action and an identifier of the software application, determine that the temporary license is not present for the software application responsive to the first command, and generate a second command that is sent to the TPM responsive to the second request, the second command specifying a license generation action and information including a license file and an identifier of the software application. The TPM is configured to generate the license via the secure register, responsive to and based on the information specified in the second command, and provide the license to the first program code.

In an embodiment, the system includes at least one of a first application programming interface (API) as a first portion of the second program code, the first API configured to generate and send the first command, wherein the first request is a call to the first API, or a second API as a second portion of the second program code, the second API configured to generate and send the second command, wherein the second request is a call to the second API.

In an embodiment of the system, the first program code is configured to provide the first request based on determining that a license server is unreachable over a network.

In an embodiment of the system, the second program code is configured to determine an expiration of the license with respect to a time stamp, and the TPM is configured to return an invalidation indication response to the second command, the invalidation indication response indicating that the license is invalid for the application.

In an embodiment of the system, the TPM is configured to generate the invalidation indication response based on at least one of a determination that the license has been altered, or a determination of a mismatch between the license and a registry entry related to the license.

In an embodiment of the system, the TPM includes a key generator configured to generate a key associated with the license file, and store the key as mapped to the license file in a mapping data structure.

In an embodiment of the system, the TPM includes an operator configured to generate at least one of a hash, or generate a signature of the license file using the key, that is utilized in the generation of the license, and provide the license to the second program code as a response to the second command.

A computer-readable storage medium having program instructions recorded thereon that, when executed by a processing device, perform a method, is also described. The method may be for protecting software licensing information via a TPM, as described herein. The method includes receiving a request at a license manager to generate a license for a software application based at least on the software application lacking a license, the request including a license file specific to the software application, and generating a command that is sent to a trusted platform module (TPM) responsive to the request, the command specifying a license generation action and information including the license file and an identifier of the software application. The method also includes generating a key configured sign and verify a signature of the license, generating the license utilizing a secure register of the TPM responsive to the command, and based on the information and the key, and providing the license to the license manager.

In an embodiment of the computer-readable storage medium, generating the license includes generating a signature of the license file utilizing the key and based on the information.

In an embodiment of the computer-readable storage medium, the method includes generating a hash of the license file by the TPM, and extending the hash into the secure register by the TPM, and generating the key includes associating the key with a policy that restricts use of the key to the secure register based on the hash.

In the embodiment of the computer-readable storage medium, the method also includes storing the key as mapped to the license file in a mapping data structure.

In an embodiment of the computer-readable storage medium, the method includes at least one of providing a validation indication response to the command, or determining that a license server is unreachable over a network, and providing the request to the license manager based on the license server being unreachable.

V. CONCLUSION

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system comprising:
   a processing unit; and
   a memory coupled to the processing unit and storing instructions that, when executed, perform operations comprising:
   receiving a command at a trusted security mechanism on a client device, the command specifying an identifier of a software component of the client device, the software component providing a request to determine whether a license for the software component is valid;
   retrieving, by the trusted security mechanism, a key mapped to the identifier, wherein the key is used to sign and verify the license;
   validating the license at the trusted security mechanism based on the key, the license being stored by the client device; and
   providing, by the trusted security mechanism, a validation response to the command.

2. The system of claim 1, wherein the software component is a software application or service that is:
   installed on the client device; or
   accessible remotely by the client device.

3. The system of claim 1, wherein the request is provided by the software component in response to at least one of:
   a user attempting to execute functionality of the software component; or
   the software component attempting to automatically execute functionality of the software component.

4. The system of claim 1, the operations further comprising:
   prior to receiving the command, determining, by the software component, at least one of:
   the client device is in an offline state; or
   a license device external to the client device is unreachable, the license device being configured to perform license validation for the software component.

5. The system of claim 1, wherein the command further specifies a license generation action for generating an updated license at the trusted security mechanism.

6. The system of claim 5, wherein the command further specifies license information for the license, the license information including at least one of:
   a validity period for the license; or
   permissions for the license.

7. The system of claim 6, wherein validating the license comprises generating the updated license:
   in response to the license generation action; and
   based on the license information and the key.

8. The system of claim 1, wherein the key is asymmetric and is generated based on a hash of the license.

9. The system of claim 1, wherein, if the validation response indicates the license is invalid, the client device is unable to execute functionality of the software component that is provided by the license.

10. The system of claim 1, wherein a mapping of the key to the identifier includes a license identifier for the license, the license identifier identifying at least one of:
    a name of the license; or
    a storage location of the license on the client device.

11. A method comprising:
    receiving a command at a trusted security mechanism on a client device, the command specifying a software identifier of a software component of the client device, the software component providing a request to determine whether a license for the software component is valid;
    retrieving, by the trusted security mechanism, a key associated with the software identifier and a license identifier for the license;
    validating, by the trusted security mechanism, the license based on the key, the license being stored by the client device; and
    providing, by the trusted security mechanism, a validation response that is responsive to the request.

12. The method of claim 11, wherein the request is received by a licensing manager of the client device, the licensing manager providing the command to the trusted security mechanism.

13. The method of claim 11, further comprising:
    prior to receiving the command, determining, by the software component, that the license is inaccessible or cannot be found.

14. The method of claim 11, wherein the command further specifies a licensing file corresponding to the license, the licensing file comprising a validity period for the license.

15. The method of claim 11, wherein the key is used to cryptographically sign the license and is stored in a key store of the trusted security mechanism.

16. A system comprising:
    a processing unit; and
    a memory coupled to the processing unit and storing instructions that, when executed, perform operations comprising:
    receiving, at a license manager on a computing device, a request to generate a license for a software component of the computing device, wherein the request is based on a license verification request from the software component and includes a license information file specific to the software component;
    sending a command to a trusted security mechanism on the computing device responsive to the request, the command specifying the license information file and an identifier of the software component;
    receiving the license from the trusted security mechanism;
    receiving, from the trusted security mechanism, a validation response that is responsive to the command; and
    and providing the validation response to the software component.

17. The system of claim 16, wherein the request to generate the license is based on determining one of:
    a previous license for the software component is no longer valid; or
    a license was not previously issued for the software component.

18. The system of claim 16, wherein the command further specifies a license generation action that instructs the trusted security mechanism to generate the license.

19. The system of claim 16, wherein the validation response indicates the license is valid to enable access to the software component.

20. The system of claim 16, wherein, in response to determining the validation response indicates the license is invalid, functionality of the software component is rendered inaccessible.

* * * * *